United States Patent
Brown et al.

(10) Patent No.: US 8,544,258 B2
(45) Date of Patent: Oct. 1, 2013

(54) EXHAUST TREATMENT SYSTEM DIAGNOSTIC VIA AMMONIUM NITRITE DECOMPOSITION

(75) Inventors: David B. Brown, Brighton, MI (US); Michael J. Paratore, Jr., Howell, MI (US); Michael B. Viola, Macomb Township, MI (US)

(73) Assignee: GM Global Technology Operations LLC

( * ) Notice: Subject to any disclaimer, the term of this patent is extended or adjusted under 35 U.S.C. 154(b) by 1543 days.

(21) Appl. No.: 11/234,004

(22) Filed: Sep. 23, 2005

(65) Prior Publication Data

US 2007/0068139 A1    Mar. 29, 2007

(51) Int. Cl.
*F01N 3/00*    (2006.01)

(52) U.S. Cl.
USPC ............ 60/277; 60/274; 60/284; 60/286; 60/295

(58) Field of Classification Search
USPC ............ 60/274, 277, 284, 286, 295, 301
See application file for complete search history.

(56) References Cited

U.S. PATENT DOCUMENTS

| | | | | | |
|---|---|---|---|---|---|
| 3,882,451 | A | * | 5/1975 | Fujishiro et al. | 340/449 |
| 5,177,463 | A | * | 1/1993 | Bradshaw et al. | 340/438 |
| 5,419,122 | A | * | 5/1995 | Tabe et al. | 60/274 |
| 5,630,315 | A | * | 5/1997 | Theis | 60/274 |
| 5,675,967 | A | * | 10/1997 | Ries-Mueller | 60/274 |
| 5,706,652 | A | * | 1/1998 | Sultan | 60/274 |
| 5,842,341 | A | * | 12/1998 | Kibe | 60/274 |
| 5,860,277 | A | * | 1/1999 | Schnaibel et al. | 60/274 |
| 6,202,406 | B1 | * | 3/2001 | Griffin et al. | 60/274 |
| 6,401,450 | B1 | * | 6/2002 | Hoshi | 60/277 |
| 6,408,616 | B1 | * | 6/2002 | Mazur et al. | 60/277 |
| 6,438,943 | B1 | * | 8/2002 | Yamamoto et al. | 60/274 |
| 6,463,732 | B2 | * | 10/2002 | Baeuerle et al. | 60/274 |
| 7,082,752 | B2 | * | 8/2006 | Plote et al. | 60/277 |

FOREIGN PATENT DOCUMENTS

DE    10013893 A1    3/2000
EP    1174601 A2    1/2002

* cited by examiner

*Primary Examiner* — Thomas Denion
*Assistant Examiner* — Jesse Bogue

(57) ABSTRACT

A method of monitoring operation of an exhaust treatment system of a diesel engine includes injecting a dosing agent into an exhaust and monitoring the operating conditions of an engine during normal driving conditions. A control module monitors inlet and outlet temperatures of a catalyst and compares the inlet temperature to the outlet temperature. The control module further evaluates the exhaust treatment system based on the inlet temperature, the outlet temperature and a predetermined temperature threshold.

22 Claims, 3 Drawing Sheets

EXHAUST TREATMENT SYSTEM DIAGNOSTIC VIA AMMONIUM NITRITE DECOMPOSITION

FIELD OF THE INVENTION

The present invention relates to vehicle exhaust systems, and more particularly to evaluating operation of an exhaust treatment system.

BACKGROUND OF THE INVENTION

Diesel engine operation involves combustion that generates exhaust gas. During combustion, an air/fuel mixture is delivered through an intake valve to cylinders and is combusted therein. After combustion, the piston forces the exhaust gas in the cylinders into an exhaust system. The exhaust gas may contain emissions such as oxides of nitrogen (NOx) and carbon monoxide (CO).

An exhaust treatment system is typically used to reduce vehicle emissions. A control module monitors engine operation and a dosing system selectively injects urea into the exhaust upstream from a catalyst. The treated exhaust reacts with the catalyst. A chemical reaction occurs that heats the catalyst and reduces emissions in the exhaust. More specifically, the chemical reaction decomposes the NOx and urea into separate elements. NOx decomposes into nitrogen and water. The urea decomposes into ammonia, which is stored on the surface of the catalyst.

During cold-start periods, the exhaust temperatures are relatively low. NOx that is formed during the combustion process reacts with the ammonia that was previously stored on the catalyst surface. As a result, ammonium nitrite is deposited on the surface of the catalyst. The formation of ammonium nitrite occurs when ammonia exists on the catalyst surface and exhaust temperatures are below 60 degrees Celsius (60° C.). Ammonium nitrite is stable below 60° C. As the temperature of ammonium nitrite increases above 60° C., the compound decomposes. The decomposition of ammonium nitrite is highly exothermic and tends to increase catalyst temperatures.

The dosing system typically includes a urea supply and an injector. The urea delivered should be based on the level of emissions to effectively treat the exhaust gas. An insufficient treatment of the exhaust gas may be caused by a faulty injector or an insufficient supply of urea.

SUMMARY OF THE INVENTION

Accordingly, the present invention provides a diagnostic system for an exhaust treatment system that treats exhaust gas exiting a diesel engine and that includes a dosing system that injects urea to treat the exhaust gas. The system includes a catalyst that reacts with a urea/exhaust mixture, an inlet temperature sensor that monitors an inlet temperature of the catalyst and an outlet temperature sensor that monitors an outlet temperature of the catalyst. A control module monitors operating conditions of the engine and compares the inlet temperature to the outlet temperature. The control module evaluates operation of the exhaust treatment system based on the comparison and a predetermined temperature threshold.

In one feature, the dosing system includes a urea supply and an injector that supplies the urea to the exhaust gas.

In other features, the inlet temperature is based on an inlet bed temperature of the catalyst and the outlet temperature is based on an outlet bed temperature of the catalyst. The inlet and outlet temperatures include exhaust gas temperatures.

In another feature, the control module calculates the outlet temperature during a predetermined time period. The time period includes a starting time and an ending time.

In another feature, the operating conditions of the engine include engine rotation, air intake and engine temperature.

In still another feature, the temperature threshold includes a temperature that exceeds the outlet temperature by a minimum of 10° C.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
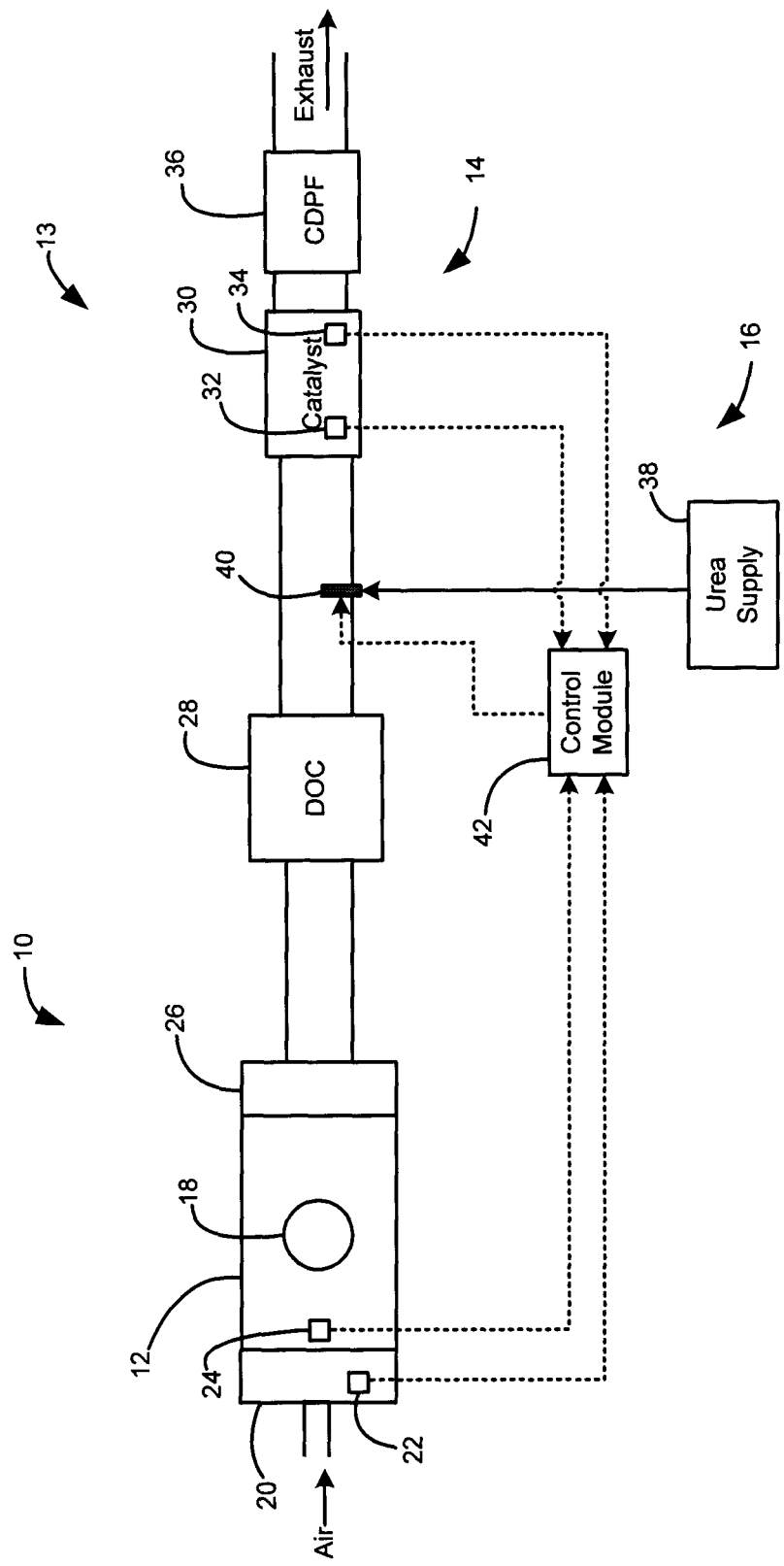
FIG. 1 is a functional block diagram of an engine system including an exhaust treatment system with temperature sensors integrated within a catalyst according to the present invention.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit and/or other suitable components that provide the described functionality.

Referring now to FIG. 1, a diesel engine system 10 is schematically illustrated. The diesel engine system 10 includes a diesel engine 12 and an exhaust treatment system 13. The exhaust treatment system 13 further includes an exhaust system 14 and a dosing system 16. The diesel engine 12 includes a cylinder 18, an intake manifold 20, a mass air flow (MAF) sensor 22 and an engine speed sensor 24. Air flows into the engine 12 through the intake manifold 20 and is monitored by the MAF sensor 22. The air is directed into the cylinder 18 and is combusted with fuel to drive pistons (not shown). Although a single cylinder 18 is illustrated, it can be appreciated that the diesel engine 12 may include additional cylinders 18. For example, diesel engines having 2, 3, 4, 5, 6, 8, 10, 12 and 16 cylinders are anticipated.

Exhaust gas is produced inside the cylinder 18 as a result of the combustion process. The exhaust system 14 treats the exhaust gas before releasing the exhaust gas to the atmosphere. The exhaust system 14 includes an exhaust manifold 26 and a diesel oxidation catalyst (DOC) 28. The exhaust manifold 26 directs exhaust exiting the cylinder towards the DOC 28. The exhaust is treated within the DOC 28 to reduce the emissions. The exhaust system 14 further includes a catalyst 30, preferably a selective catalyst reducing (SCR) catalyst, an inlet temperature sensor 32, an outlet temperature sensor 34 and catalyzed diesel particulate filter (CDPF) 36. The DOC 28 reacts with the exhaust gas prior to treating the exhaust to reduce emission levels of the exhaust. The catalyst 30 reacts subsequent to treating the exhaust to further reduce emissions.

Figure 2:
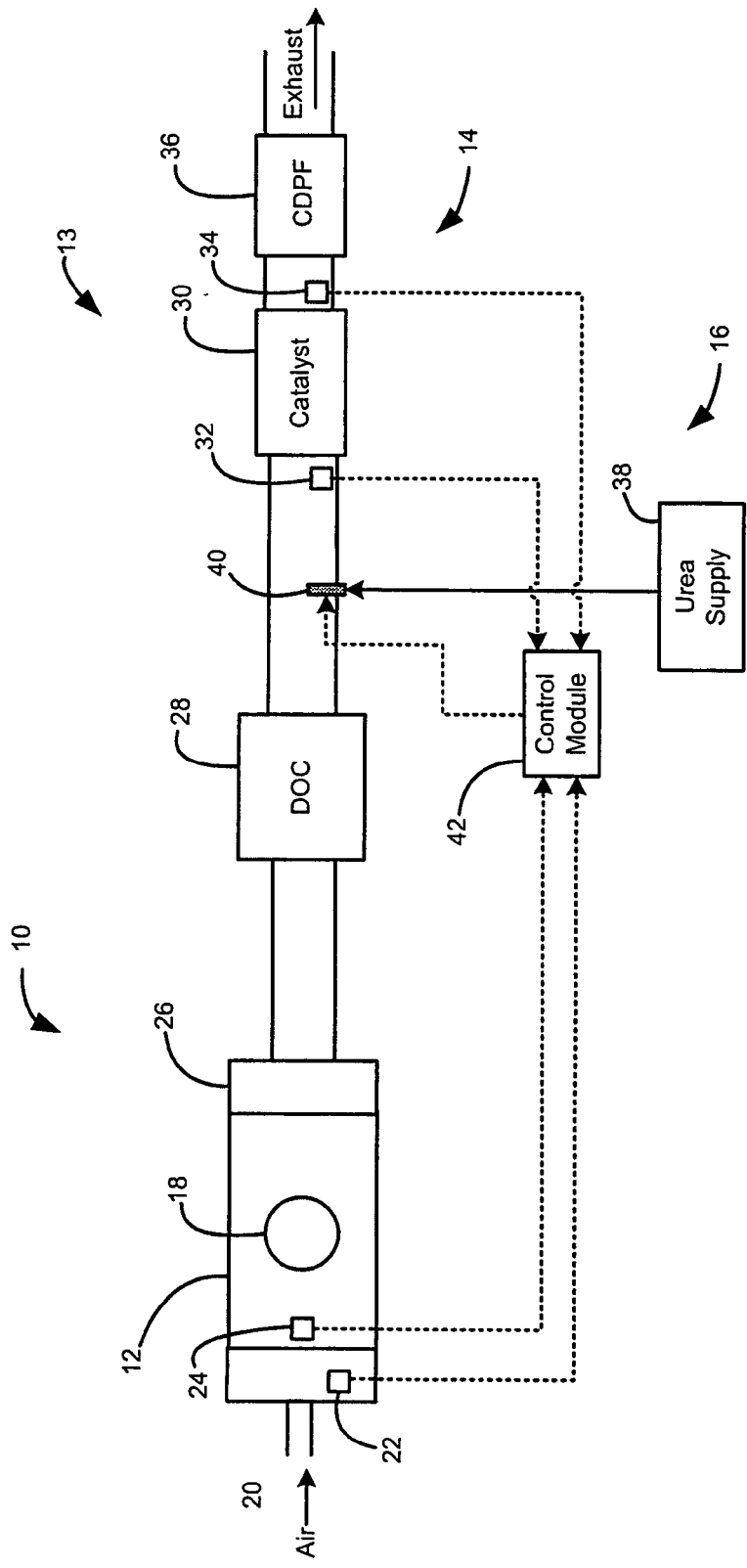
FIG. 2 is a functional block diagram of an engine system including an exhaust treatment system with temperature sensors located externally from a catalyst according to the present invention.

The inlet temperature sensor 32 is preferably located within the catalyst 30 to monitor the temperature change at the inlet of the catalyst 30, as discussed further below. The outlet temperature sensor 34 is preferably located in the catalyst to monitor the temperature change at the outlet of the catalyst 30, as discussed further below. Although the exhaust treatment system 13 is illustrated as including the inlet and outlet temperature sensors 32, 34 as being integrated within the catalyst 30, the inlet and outlet temperature sensors 32, 34 can be located externally from the catalyst to monitor the temperature change of the exhaust at the inlet and outlet of the catalyst. (See FIG. 2). The CDPF 36 further reduces emissions by trapping diesel particulates (i.e., soot) within the exhaust.

The dosing system 16 includes a urea supply 38 and a dosing injector 40. The dosing system 16 injects urea into the exhaust. The urea mixes with the exhaust and further reduces the emissions when the exhaust/urea mixture is exposed to the catalyst 30.

A control module 42 regulates operation of the engine system 10 and monitors operation of the dosing system 16 according to the present invention. The control module 42 receives temperature signals from the temperature sensors 32, 34. The control module 42 further monitors operation of the exhaust treatment system 13 based on the change in temperature at the inlet and outlet of the catalyst 30, as described in further detail below.

The exhaust treatment diagnostic system of the present invention determines whether the exhaust treatment system 13 is operating properly based on the bed temperatures of the catalyst 30 during defined cold-start periods. More specifically, the exhaust treatment diagnostic determines whether appropriate temperature gains at the inlet bed ($T_{IN}$) and outlet bed ($T_{OUT}$) of the catalyst 30 are present. $T_{IN}$ is determined by an inlet temperature sensor 32 that is located at the inlet of the catalyst 30, preferably within the catalyst itself. $T_{OUT}$ is determined by an outlet temperature sensor 34 located at the outlet of the catalyst 30. Similarly, it is preferred that the temperature sensor is located within the catalyst 30. It can be anticipated that $T_{IN}$ and $T_{OUT}$ can be determined by measuring the exhaust temperature at the inlet and outlet of the catalyst 30. The control module 42 further evaluates the exhaust treatment system 13 based on whether $T_{OUT}$ exceeds $T_{IN}$ during a predetermined time period, as described further below.

Prior to engine shut-down, the control module 42 determines the operating conditions of the catalyst based on the average of $T_{IN}$ and $T_{OUT}$ ($T_{AVG\_CAT}$). More specifically, the average catalyst temperature is calculated as $$T_{AVG\_CAT} = \frac{(T_{IN} + T_{OUT})}{2}.$$

When $T_{AVG\_CAT}$ exceeds 350° C. for a time period greater than a predetermined time period such as 2 minutes, the quantity of ammonia stored on the catalyst surface is diminished and the control module 42 sets a flag in the software to postpone any diagnostics on the next cold start. The diagnostic is postponed because high catalyst temperatures reduce the storage capability of the catalyst 30 thereby producing poor ammonia storage. The poor ammonia storage results in unreliable diagnostic results. When $T_{AVG\_CAT}$ is below 350° C. for a time period greater than a predetermined time period such as 5 minutes and the dosing system 16 is operating in a non-fault environment, the control module 42 sets a flag to initiate the diagnostic upon the next cold-start. The operating condition analysis described above ensures that a sufficient amount of ammonia is stored on the catalyst surface to produce accurate diagnostic results. It can be appreciated that the temperatures and times described in detail above are related to the intrinsic catalyst properties of the specific catalyst 30 used. Variations of these temperatures and times may be desired for catalysts that utilize alternate technologies.

Upon cold-start, the control module 42 determines the coolant temperature of the engine 12 based on an engine coolant temperature sensor (not shown). To enable the diagnostic, the engine coolant temperature must be less than 30° C. Additionally, the diagnostic requires the engine 12 to be off for a minimum of eight hours.

When the diagnostic is enabled, the inlet temperature sensor 32 monitors the inlet bed temperature of the catalyst 30 and generates $T_{IN}$. When $T_{IN}$ reaches 30° C., the control module 42 will initiate a timer to run for approximately 100 seconds. During this time period, The outlet temperature sensor 34 monitors the outlet bed temperature of the catalyst 30 and generates $T_{OUT}$. The control module 42 compares $T_{OUT}$ to $T_{IN}$. Additionally, the control module 42 determines engine rotation (RPM) and mass air flow (MAF) rate based on signals sent from the MAF sensor 22 and the engine speed sensor 24, respectively. The diagnostic continues if RPM and MAF rates are within acceptable threshold ranges. Otherwise, the control module 42 aborts the diagnostic. An acceptable threshold range for engine RPM ($RPM_{THR}$) is approximately 500 to 1500 RPM. An acceptable threshold range for MAF rate ($MAF_{THR}$) rate is approximately 20 to 80 g/sec.

Furthermore, the control module 42 evaluates the performance of the exhaust treatment system 13 based on a comparison of $T_{OUT}$ and $T_{IN}$. More specifically, The control module 42 indicates a "pass" status when $T_{OUT}$ exceeds $T_{IN}$ by a minimum 10° C. during the 100 second time period. When $T_{OUT}$ fails to exceed $T_{IN}$ by a minimum of 10° C., the control module 42 indicates a "fail" status and the control module 42 logs the result.

Figure 3:
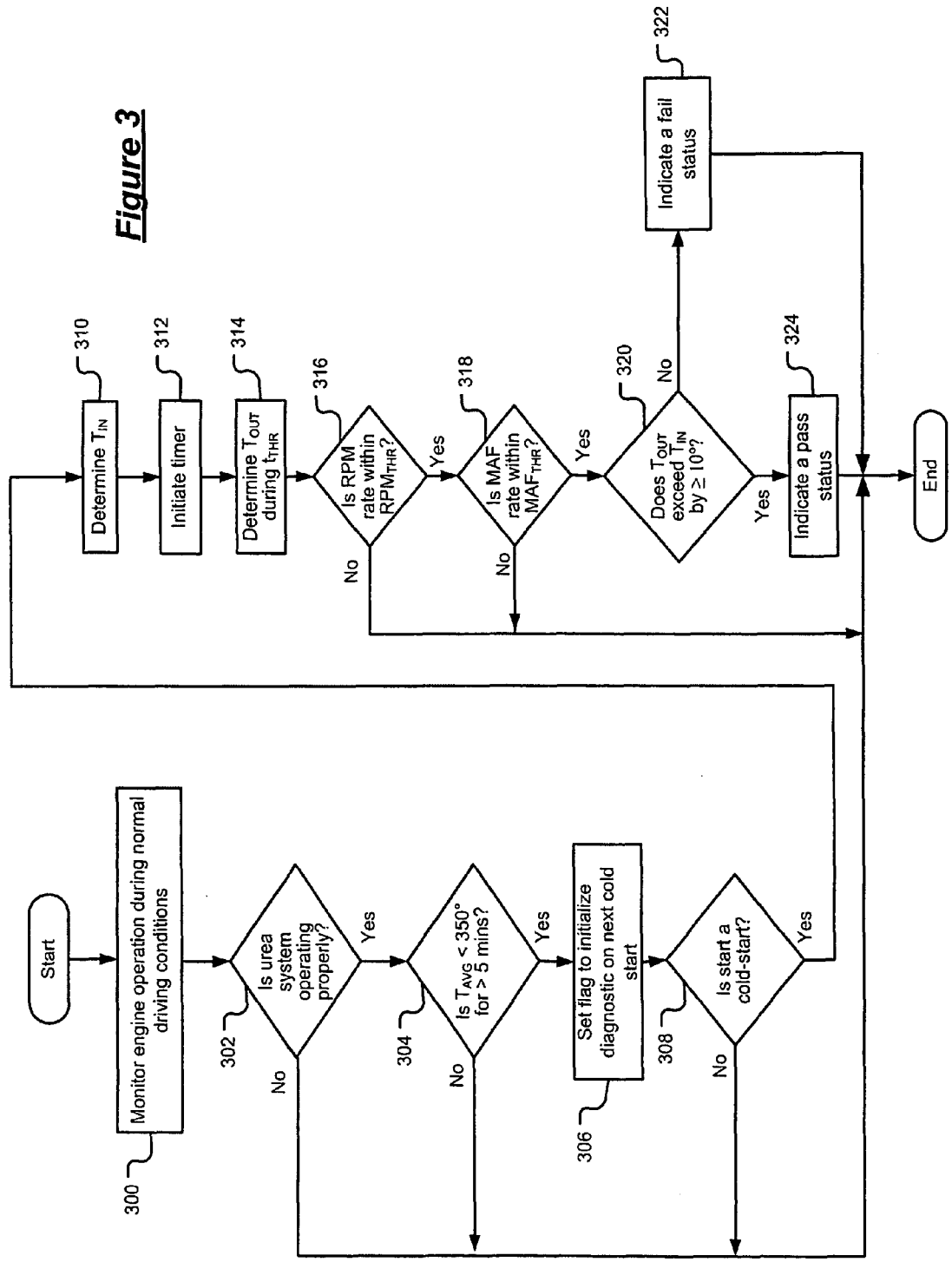
FIG. 3 is a flowchart illustrating steps executed by an exhaust treatment diagnostic system according to the present invention.

Referring now to FIG. 3, a flowchart illustrates steps executed by the exhaust treatment diagnostic. Control monitors engine operating conditions during normal operation in step 300. In step 302, control determines whether the dosing system 16 is operating properly based on a pass/fail log of the dosing system. In step 304, control determines whether the average catalyst temperature during normal driving operation ($T_{AVG\_CAT}$) is within an appropriate threshold range (i.e., 350° C.). When $T_{AVG\_CAT}$ is below 350° C. for greater than 5 minutes, then control sets a flag to initialize the diagnostic on the next cold-start in step 306. Otherwise, control ends. In step 308, control determines whether the next start meets the defined cold-start requirements. Specifically, the term cold-start describes the scenario where engine coolant temperatures of less than 30° C. are required. In addition, the engine 12 shall not have been operational for a minimum of 8 hours. The minimum operating time requirement is to insure that exhaust and engine temperatures are stable. If a cold-start exists, then control determines $T_{IN}$ in step 310. Otherwise, control ends.

When $T_{IN}$ reaches 50° C., control initiates a timer that determines the time period in which $T_{OUT}$ is monitored in step 312. In step 314, $T_{OUT}$ will be monitored for a duration of approximately 100 seconds. Additionally, control determines whether engine rotation falls within a predetermined RPM threshold range ($RPM_{THR}$) in step 316. An acceptable $RPM_{THR}$ that will produce reliable results is approximately 500 to 1500 RPM. If the RPM is within $RPM_{THR}$, then control determines the MAF rate in step 320. Otherwise, control ends. If MAF is within $MAF_{THR}$, then control evaluates the exhaust treatment system 13 based on $T_{IN}$ and $T_{OUT}$ in step 322. If $T_{OUT}$ exceeds $T_{IN}$ by 10° C. during the 100 second time period, control will indicate a "pass". Otherwise, control will indicate "fail" and control ends. The result will be logged by the control module, and the number of "pass" and "fail" events will be compared to the number of diagnostics performed to determine the overall health of the exhaust treatment system 13.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An exhaust treatment diagnostic system comprising:
    an inlet temperature sensor that monitors an inlet temperature of a catalyst;
    an outlet temperature sensor that monitors an outlet temperature of the catalyst; and
    a control module that determines an engine temperature and, if the engine temperature is less than an engine temperature threshold, that selectively performs a diagnosis of an exhaust treatment system during a selected time period that is initiated during a cold start, and that outputs a passing status when a differential between the outlet temperature and the inlet temperature is greater than a predetermined threshold during the selected time period.

2. The exhaust treatment diagnostic system of claim 1 wherein the control module outputs the passing status when the differential between the outlet temperature and the inlet temperature is greater than the predetermined threshold at any point during the selected time period.

3. The exhaust treatment diagnostic system of claim 1 wherein the predetermined threshold is 10° C.

4. The exhaust treatment diagnostic system of claim 1 wherein the cold start is defined by an engine off time being greater than 8 hours.

5. The exhaust treatment diagnostic system of claim 1 wherein the control module begins the selected time period when the inlet temperature is greater than a temperature threshold.

6. The exhaust treatment diagnostic system of claim 5 wherein the control module ends the selected time period a predetermined time after the selected time period begins.

7. The exhaust treatment diagnostic system of claim 5 wherein the control module ends the selected time period based on at least one of engine speed, mass air flow into the engine, and engine coolant temperature.

8. An exhaust treatment diagnostic system comprising:
    an inlet temperature sensor that monitors an inlet temperature of a catalyst;
    an outlet temperature sensor that monitors an outlet temperature of the catalyst; and
    a control module that selectively performs a diagnosis of an exhaust treatment system during a selected time period of a cold start and outputs a passing status when a differential between the outlet temperature and the inlet temperature is greater than a predetermined threshold during the selected time period, wherein the control module determines a state of ammonia stored on the catalyst based on a comparison of a catalyst temperature and an ammonia storage temperature threshold over a predetermined period of time, wherein the control module disables performance of the diagnosis based on the state of ammonia.

9. The exhaust treatment diagnostic system of claim 1 wherein the diagnosis outputs a failing status when a differential between the inlet temperature and the outlet temperature is less than a predetermined threshold during the entire selected time period.

10. A method comprising:
    monitoring an inlet temperature of a catalyst;
    monitoring an outlet temperature of the catalyst;
    determining an engine temperature, and if the engine temperature is less than an engine temperature threshold selectively performing a diagnosis of an exhaust treatment system during a selected time period that is initiated during a cold start; and
    outputting a passing status when a differential between the outlet temperature and the inlet temperature is greater than a predetermined threshold during the selected time period.

11. The method of claim 10 further comprising outputting the passing status when the differential between the outlet temperature and the inlet temperature is greater than the predetermined threshold at any point during the selected time period.

12. The method of claim 10 wherein the predetermined threshold is 10° C.

13. The method of claim 10 wherein the cold start is defined by an engine off time greater than 8 hours.

14. The method of claim 10 further comprising beginning the selected time period when the inlet temperature is greater than a predetermined temperature threshold.

15. The method of claim 14 further comprising ending the selected time period a predetermined time after beginning the selected time period.

16. The method of claim 14 further comprising ending the selected time period based on at least one of engine speed, mass air flow into the engine, and engine coolant temperature.

17. A method comprising:
    monitoring an inlet temperature of a catalyst;
    monitoring an outlet temperature of the catalyst;
    selectively performing a diagnosis of an exhaust treatment system during a selected time period of a cold start;
    outputting a passing status when a differential between the outlet temperature and the inlet temperature is greater than a predetermined threshold during the selected time period;
    determining a state of ammonia stored on the catalyst based on a comparison of a catalyst temperature and an ammonia storage temperature threshold over a predetermined period of time; and
    disabling the performing based on the state of the ammonia.

18. A method comprising:
    monitoring an inlet temperature of a catalyst;
    monitoring an outlet temperature of the catalyst;
    selectively performing a diagnosis of an exhaust treatment system during a selected time period of a cold start;

outputting a passing status when a differential between the outlet temperature and the inlet temperature is greater than a predetermined threshold during the selected time period;

determining a state of ammonia stored on the catalyst based on a comparison of a catalyst temperature and an ammonia storage temperature threshold over a predetermined period of time;

disabling the performing based on the state of the ammonia; and disabling performing the diagnosis based on the state of ammonia stored on the catalyst.

19. The exhaust treatment diagnostic system of claim 1 wherein the cold start occurs while an engine coolant temperature is less than 30° C.

20. The method of claim 10 wherein the cold start occurs while an engine coolant temperature is less than 30° C.

21. The exhaust treatment diagnostic system of claim 1 wherein, when an average temperature of the catalyst, after the cold start and before an engine shutdown, is greater than a temperature threshold, the control module does not perform the diagnosis during a subsequent cold start that occurs after the engine shut-down.

22. The exhaust treatment diagnostic system of claim 21 wherein the average temperature is based on the inlet temperature and the outlet temperature.

* * * * *